United States Patent

Huybrechts et al.

US005977256A

[11] Patent Number: 5,977,256
[45] Date of Patent: Nov. 2, 1999

[54] SCRATCH-RESISTANT COATING COMPOSITION

[75] Inventors: Jozef Huybrechts, Oud-Turnhout, Belgium; Stuart Alexander Kernaghan, Bonn, Germany; Robert Vervoort, Deurne-Antwerpen, Belgium

[73] Assignee: E.I. du Pont de Nemours and Company, Wilmington, Del.

[21] Appl. No.: 08/930,666

[22] PCT Filed: Apr. 29, 1996

[86] PCT No.: PCT/US96/05950

§ 371 Date: Oct. 29, 1997

§ 102(e) Date: Oct. 29, 1997

[87] PCT Pub. No.: WO96/34924

PCT Pub. Date: Nov. 7, 1996

[51] Int. Cl.⁶ .................. C09D 133/06; C09D 161/28; C09D 167/08; C09D 175/04
[52] U.S. Cl. ............. 525/131; 525/124; 525/159; 525/160; 525/162; 524/507; 524/512; 524/513
[58] Field of Search .................. 525/131, 159, 525/160, 162, 124

[56] References Cited

U.S. PATENT DOCUMENTS

| | | | |
|---|---|---|---|
| 4,020,216 | 4/1977 | Miller | 428/425 |
| 4,301,209 | 11/1981 | Lorenz et al. | 428/339 |
| 4,374,164 | 2/1983 | Blank | 427/385.5 |
| 4,681,815 | 7/1987 | Rutkiewic et al. | 428/458 |
| 4,895,768 | 1/1990 | Tang | 428/461 |
| 4,933,214 | 6/1990 | Sugiura et al. | 427/379 |
| 4,960,828 | 10/1990 | Higuchi et al. | 525/162 |
| 5,015,688 | 5/1991 | Bederke et al. | 524/600 |
| 5,187,199 | 2/1993 | Sudo | 523/523 |
| 5,202,406 | 4/1993 | Dearth et al. | 528/45 |
| 5,281,443 | 1/1994 | Briggs et al. | 427/407.1 |
| 5,290,848 | 3/1994 | Palmer et al. | 524/517 |
| 5,354,797 | 10/1994 | Anderson et al. | 524/285 |
| 5,399,611 | 3/1995 | Mathai | 524/500 |
| 5,552,184 | 9/1996 | Klostermann et al. | 427/284 |

FOREIGN PATENT DOCUMENTS

| | | | |
|---|---|---|---|
| 0 267 376 | 1/1990 | European Pat. Off. | B05D 7/04 |
| 579 193 A1 | 7/1993 | European Pat. Off. | C08G 18/80 |
| 0653 468 A3 | 8/1994 | European Pat. Off. | C09D 133/04 |
| 0 688 840 A3 | 6/1995 | European Pat. Off. | C09D 167/00 |
| 280 7923 | 2/1978 | Germany | C08J 7/16 |
| 0219 6866 | 8/1990 | Japan . | |
| 0 402 8540 | 1/1992 | Japan . | |
| 405 7819 | 2/1992 | Japan | C08G 59/20 |
| 405 7820 | 2/1992 | Japan | C08G 59/20 |
| 427 7066 | 10/1992 | Japan | B05D 7/24 |
| 6-27272 | 4/1994 | Japan | C09D 5/24 |
| 600 8369 | 6/1994 | Japan | B32B 15/08 |
| 259 5765 | 1/1997 | Japan | B32B 27/00 |

OTHER PUBLICATIONS

Betz, P., Bartelt, A., Scratch–resistant Clear Coats: Development of new testing methods for improved coatings, *Prog. Org. Coat.*, 22, 27–37, 1993.

*Primary Examiner*—Patricia A. Short
*Attorney, Agent, or Firm*—James A. Costello; Sudhir G. Deshmukh

[57] ABSTRACT

A coating composition comprising a crosslinkable binder in an organic solvent, the binder composed of acrylic and polyester polyols plus a crosslinking agent, the polyester polyol containing a component derived from one or both of: a residue of dimer fatty acid and polyol, or residue of a polyacid and dimer alcohol, the composition being useful for coating metallic substrates.

8 Claims, No Drawings

SCRATCH-RESISTANT COATING COMPOSITION

BACKGROUND OF THE INVENTION

1. Field of the Invention

This invention concerns a metal-coating composition containing acrylic polyol(s), polyester polyol(s) and a crosslinking agent.

2. State of the Art

The coating composition of this invention is useful primarily on metallic-substrates, particularly on vehicles such as automobiles and trucks. Such coating will protect the substrate and provide an attractive aesthetic finish. A typical vehicle has several coating layers. The substrate is typically first coated with an inorganic rust-proofing zinc or iron phosphate layer over which is applied an electrocoated primer or repair primer. Optionally, a primer surfacer can be employed for better appearance and improved adhesion. A pigmented basecoat or colorcoat is next applied over the primer. A typical basecoat or colorcoat may contain metallic flakes to provide a metallic finish. To protect and preserve the aesthetic qualities of the color finish, a clear (unpigmented) topcoat is often applied over the pigmented basecoat to protect the basecoat even on prolonged weathering. Clearcoats are predominantly based on a technology where the binders are hydroxy functional acrylics crosslinked with alkoxylated melamine formaldehyde adducts. The coatings are typically baked at ±130° C. after application wet-on-wet on a basecoat. Because of severe field complaints, the automobile coating industry is asking for improved scratch resistance of the clearcoats.

The composition of this invention has been found to provide particularly desirable scratch-resistance to the metallic substrate coating art. This improvement is in addition to attributes of good weatherability, chemical-resistance, water-resistance, etch-resistance and mechanical characteristics. This improved package of properties derives from the interrelationship of the selected acrylic and polyester polyols and the crosslinker selected for use therewith. Most particularly, the improved properties are derived from the dimer acid/alcohol component of the polyester polyol as will be described in more detail hereafter.

SUMMARY OF THE INVENTION

The coating composition of this invention is a crosslinkable binder in an organic solvent, the binder comprising the following components based on total weight of binder:

i) about 15 to 70 percent of an acrylic polyol having a weight average molecular weight of about 2,500 to 40,000; a hydroxyl value of about 50 to 180 mg KOH/g; and a glass transition temperature of between −30 to 70° C.;

ii) about 5 to 60 percent of an optionally substituted polyester polyol having a weight average molecular weight of about 2,000 to 80,000; and a hydroxyl value of about 50 to 220 mg KOH/g;

the polyol comprising at least about 10 percent by weight of the hydrogenated reaction product of at least one of:
  a) dimer fatty acid and polyol,
  b) polyacid and dimer alcohol, and
  c) dimer fatty acid and dimer alcohol, the reaction product having at least two groups selected from acid and alcohol functionalities; and iii) about 10 to 60 percent of a crosslinking agent selected from at least one of an alkoxylated melamine formaldehyde adduct and a polyisocyanate (which may be blocked).

Preferred compositions are those in which the acrylic polyol has a molecular weight of 3,000 to 10,000; a hydroxyl value of 80 to 150; and a glass transition temperature of −10 to 50° C. Also preferred are compositions in which the acrylic polyol contains at least one trialkoxysilyl or urethane group; in which the polyester polyol has a molecular weight of 2,500 to 15,000; a hydroxyl value of 100 to 170; and about 30 to 60 percent, by weight of polyester polyol, of hydrogenated reaction product selected from a), b) and c); in which the polyester polyol contains substituents selected from at least one member of the group trialkoxysilyl and urethane; in which the binder comprises about 20 to 85 percent by weight of the solvent plus binder; and in which the polyester polyol comprises at least 10 percent of hydrogenated reaction product.

Most preferred are compositions comprising acrylic and polyester polyols and alkoxylated melamine formaldehyde adducts in a one-package system. Such a system may contain a blocked polyisocyanate. Other compositions are two-package systems comprising the acrylic and polyester polyols in one package and an unblocked polyisocyanate in the second package. The coatings of this invention are useful in topcoats for metallic substrates that include vehicles and outdoor structures. The topcoats can be clear (without pigment) or they can contain pigment.

Each of the dimer fatty acid and dimer alcohols described in a), b) and c) have at least 34 carbon atoms. In addition, the hydrogenated reaction product of each of a), b) and c) can contain significant amounts of polyacids and polyalcohols such as trimer acids and trimer alcohols as will be appreciated by one skilled in the art.

DETAILS OF THE INVENTION

The binders described herein improve clearcoat elasticity without negative impact on appearance and other properties. Appearance of a final colorcoat-clearcoat finish depends a great deal on attack by the clearcoat binders on the basecoat. It is known that polyester resins can attack basecoats much more than acrylics. This attack results in redissolution of the basecoat giving surface roughness, lower gloss and lower clarity of the final finish. This negative effect is more pronounced for oligomers due to low Mw and high hydroxyl values. Such hydroxylated polyesters, however, do increase the elasticity of the final crosslinked formulation which results in improved scratch resistance. The binders employed in the coatings described herein effect improved appearance (less basecoat attack) without negative impact on other clearcoat properties.

The Acrylic Polyol (i)

The acrylic polyols can be obtained by copolymerizing hydroxyl-containing monomers such as hydroxyethyl acrylate, hydroxyethyl methacrylate, hydroxypropyl acrylate, hydroxypropyl methacrylate, hydroxybutyl acrylate, and the like, with other monomers typically employed in the synthesis of acrylic coating resins such as:

acrylic esters of $C_{1-18}$ monohydric alcohols such as methylacrylate, butylacrylate, 2-ethyl hexyl acrylate;

methacrylic esters of $C_{1-18}$ monohydric alcohols such as methyl methacrylate, butyl methacrylate, 2-ethyl hexyl methacrylate;

acrylic and methacrylic esters of cycloaliphatic monoalcohols such as cyclohexyl methacrylate, isobornyl methacrylate, trimethylcyclohexyl acrylate;

acrylic and methacrylic esters of aromatic monoalcohols such as phenyl methacrylate, benzyl acrylate;

vinylaromatics such as styrene, vinyl toluene, t-butylstyrene;

nitrile monomers such as acrylonitrile;

acid functional monomers such as itaconic acid, acrylic acid;

amide functional monomers such as methacrylamide, N-butoxymethyl methacrylamide;

silane functional monomers such as gamma-methacryloxypropyltriethoxysilane;

glycidyl functional monomers such as glycidyl methacrylate; and other functional comonomers including acetoacetoxyethylmethacrylate, methacryloxyethyl phosphoric acid, perfluoroalkylacrylates, methacrylates, and the like.

The acrylic polyol is prepared by conventional free radical-initiated polymerization in a solvent or solvent blend in the temperature range of 60° to 180° C. Typical solvents are aromatics, aliphatics, acetates, ketones, alcohols and ethers such as xylene, n-butanol, mineral spirits, methylethylketone, methyl isobutyl ketone, and the like.

Azo or peroxy initiators can be employed as polymerization initiators. Examples of azo initiators are the products sold under the trade name VAZO® (DuPont) including VAZO® 67, VAZO® 88 and the like. Examples of peroxy initiators are peroxyethers, peroxyesters such as di-t-butylperoxide, t-butylperacetate, t-butyl peroxy, 2-ethylhexacoate, t-butylperoxy pivalate, di-t-amylperoxide, t-amylperacetate and the like. Chain transfer agents can be utilized to control molecular weight. Examples of chain transfer agents are halogen and sulfur derivatives as 2-mercaptoethanol, tetrachloromethane, dodecylmercaptan and the like.

The acrylic copolymers can be prepared in batch or feed processes. In feed processes the monomers, initiators and chain transfer agents can be fed simultaneously or in multifeed (skewfeed) type additions. The acrylic copolymer can be modified by the chemical grafting of derivatives on the backbone binder. Examples are the reactions of lactones, mono epoxyethers, mono epoxyesters, anhydrides, and mono acids with hydroxy, acid and epoxy functional groups; specifically ε-caprolactone, valerolactone with hydroxy functional groups; mono epoxyesters such as versatic acid mono epoxyester, pivalic acid mono epoxyester with acid functional groups; anhydrides such as maleic anhydride, phthalic anhydride with hydroxy functional groups, mono acids such as myristic acid, oleic acid, isononanoic acid with epoxy functional groups. These reactions can be accomplished during the polymerization. Another way of modifying the copolymer is by reaction of the functional monomer with the modifying compounds and further copolymerization with the other monomer mixture. For example, hydroxyethyl acrylate can be reacted with ε-caprolactone before copolymerization.

Polyester Polyol (ii)

The polyester polyol can be prepared by reacting polybasic acids and polyhydric alcohols as main reactants and subjecting them to condensation reaction.

Examples of mono- and polybasic acids are aromatic acids and anhydrides, aliphatic acids and anhydrides, cycloaliphatic acids and anhydrides. Representative thereof are: phthalic anhydride, isophthalic acid, hexahydrophthalic anhydride, methylcyclohexyl anhydride, trimellitic anhydride, isononanoic acid, natural monoacids such as tall oil fatty acid, adipic acid, dodecane dioic acid, 1,4-cyclohexanedicarboxyl acid, and the like.

Examples of polyhydric alcohols are: glycerine, neopentylglycol, 1,6-hexane diol, 2,2-ethylbutyl propane diol, trimethylolpropane, monopentaerytritol, cyclohexane dimethanol, ethylene glycol and the like.

A typical structure of a long chain diacid or diol is composed of a mixture of linear, cyclic and aromatic dimers and can be drawn as follows. It will be appreciated that significant amounts of acid and/or alcohol trimers can be included without adversely affecting the coatings.

Typical Useful Diacids linear dimer

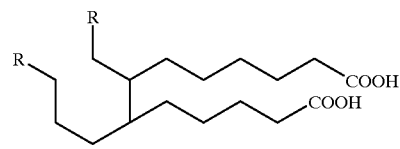

cyclic dimers

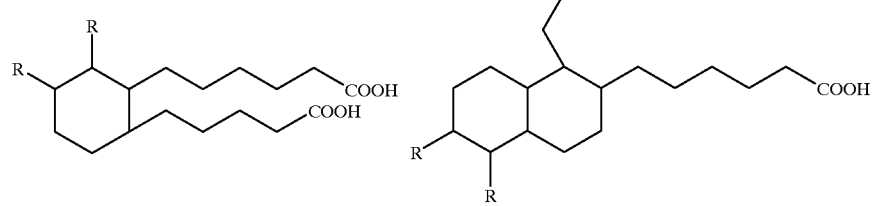

aromatic dimers
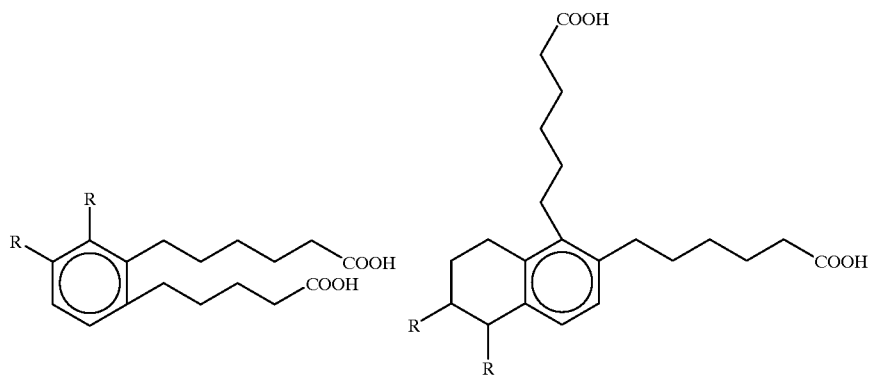
Typical Useful Diols
linear dimer
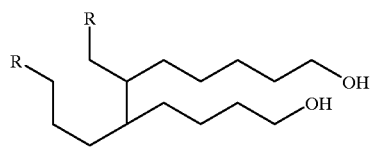
cyclic dimers
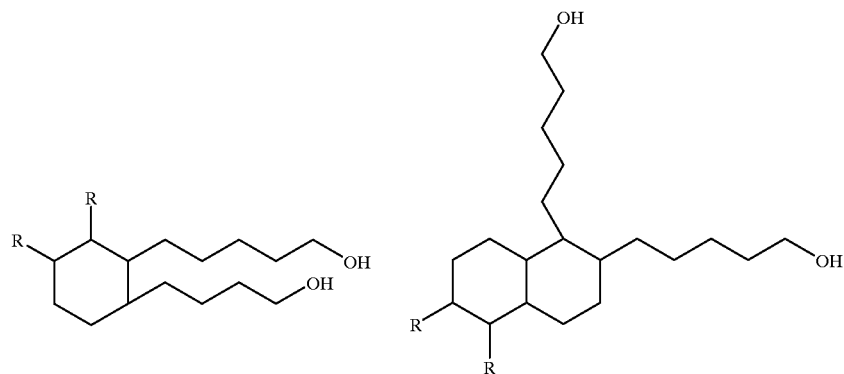
aromatic dimers
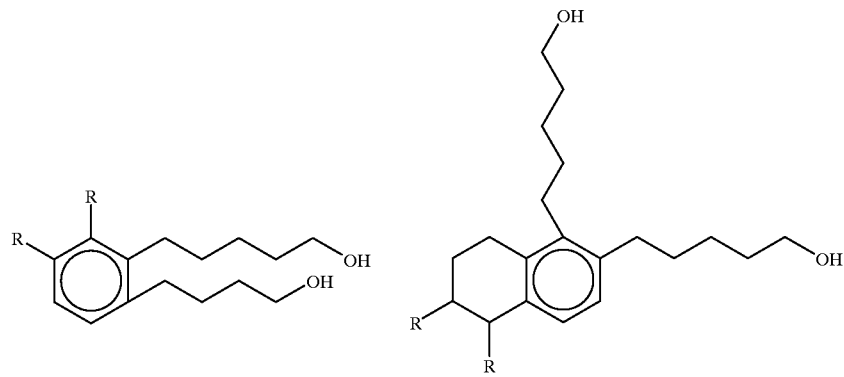
The polyester resin can be further modified with epoxyesters, epoxyethers, silane derivatives, isocyanates and the like.

The Crosslinking Agent (iii)

Coating Formulation

The clearcoat formulation is preferably crosslinked with alkoxylated melamine formaldehyde resins. Such crosslinkers are prepared from melamine, formaldehyde and alcohol in various molar ratios and molecular weights. Typical alcohols are methanol, isobutanol and n-butanol. Alkoxylated melamine formaldehyde resins are commercially available.

The clearcoat formulation can also contain other crosslinkers such as blocked polyisocyanates to improve acid etch resistance. Blocked polyisocyanates are commercially available. Preferably, the methylethylketoxime blocked trimer of isophorone diisocyanate is used as auxiliary crosslinker.

In the clearcoat composition of the invention, leveling agents, rheology modifiers, ultraviolet absorbers, light stabilizers, curing catalysts can also be employed. Leveling agents are compounds that improve surface properties. Ultraviolet absorbers and light stabilizers include benzotriazole derivatives and hindered amine light stabilizers (HALS) sold under the trade name Tinuvin® by Ciba Geigy.

Curing catalysts can be strong acids such as sulfonic and phosphonic acids; metal salts of zinc and tin; amino derivatives such as dimethylethanol amine, triethyl amine, and the like. Rheology control agents include inorganic or organic materials. Inorganic rheology control agents include silica derivatives and bentonite clays. Organic rheology control agents are nonaqueous dispersions and diurea based particles such as obtained from the reaction of 2 moles of an amine with 1 mole of an isocyanate.

The clearcoat of the invention is thermosetting and typically applied wet-on-wet over a pigmented basecoat. The coating is preferably carried out by conventional surface coating technology which includes air-spraying, airless spraying and electrostatic spray-coating techniques. The clearcoating thickness is preferably about 20 to 80 microns on a dry basis. Heat-curing is preferably conducted at about 800 to 160° C. for about 10 to 40 minutes.

The composition of this invention has excellent adhesion to a variety of substrates (particularly metallic substrates) such as previously painted substrates, cold rolled steel, phosphatized steel, and steel coated with conventional primers by electrodeposition. The present composition can also be used to coat plastic substrates such as polyester reinforced fiberglass, reaction injection-molded urethanes, partially crystalline polyamides, and the like.

Preparations of Acrylic Polyols

Preparation 1

A conventional reaction vessel for acrylic resin production equipped with a stirrer, a thermometer and a reflux condenser was charged with 14 parts of an aromatic hydrocarbon mixture (Solvesso 100). The mixture was heated at reflux with stirring and the following monomer mixture was added over 6 hours: 15 parts of styrene, 21 parts of butyl methacrylate, 9 parts of butyl acrylate, 15 parts of 2-hydroxyethyl acrylate, 3 parts of t-butylperacetate 50% solution in isododecane (Trigonox FC50 (AKZO)) and 18 parts of hydrocarbon solvent (Solvesso 100). After the 6 hour feed, 1 part of hydrocarbon solvent (Solvesso 150) was added and the reactor mixture was kept at reflux for another 30 min. Finally, 4 parts of Solvesso 150 was added. Test results on the resin solution:

| Solids Content | 60.9% |
|---|---|
| Viscosity | L + ¼ (Gardner Holdt) |
| Acid Value | 3.6 |
| Hydroxyl value | 121 |
| Number Average $M_w$ | 2100 |
| Weight Average $M_w$ | 4900 |
| $T_g$ (Calculated to the nearest °C by the Flory-Fox equation) | 11° C. |

Preparation 2

According to the procedure of Preparation 1, the reactor charge was 20 parts of xylene and a mixture of 24 parts of styrene, 12 parts of 2-ethylhexyl methacrylate, 12 parts of butyl methacrylate, 11.1 parts of 2-hydroxyethyl methacrylate, 0.9 parts of acrylic acid, 2 parts of t-butyl peroxy 3,3,5 trimethylhexanoate (Trigonox 41S) and 3 parts of Solvesso 100. These ingredients were fed over 4 hours followed by a rinse of 1 part Solvesso 100. The mixture was held 20 min after which another 0.1 part of Trigonox 41S and 3.9 parts of Solvesso 100 was added over 1 hour followed by a rinse with 1 part Solvesso 100. The mixture was held for another 20 min and finally 9 parts of Solvesso 100 was added.

| Test results on the resin solution: | |
|---|---|
| Solids content | 61% |
| Viscosity | Z5 |
| Acid value | 12.3 |
| Hydroxyl Value | 89 |
| Number Average $M_w$ | 5500 |
| Weight Average $M_w$ | 13000 |
| $T_g$ (calculated as in. Preparation 1) | 48° C. |

Preparation 3

Preparation 2 was repeated replacing 2-ethylhexyl methacrylate with 2-ethylhexyl acrylate. Test results on the resin solution:

| Solids content | 60.8% |
|---|---|
| Viscosity | Z2 ¼ |
| Acid value | 13 |
| Hydroxyl Value | 89 |
| Number Average $M_w$ | 5800 |
| Weight Average $M_w$ | 13000 |
| $T_g$ (calculated) | 19° C. |

Preparation 4

Preparation 1 was repeated with the reactor charged with 10 parts of Solvesso 100 and 22.38 parts of versatic acid monoepoxyester Cardura E10 (Shell). To the refluxing mixture were added 21 parts of styrene, 9 parts of 2-hydroxyethyl methacrylate, 7.62 parts of acrylic acid, 1.5 parts of di-tertiary-butyl peroxide (Trigonox B; AKZO) and 7.5 parts of Solvesso 100 over a period of 6 hours. A rinse of 1 part of Solvesso was added and the reactor content was held at reflux for 1 hour. Finally, 20 parts of butylacetate was added. Test results on the resin solution:

| Solids content | 61.9% |
|---|---|
| Viscosity | M |
| Acid value | 16.9 |
| Hydroxyl Value | 148 |
| Number Average $M_w$ | 2300 |
| Weight Average $M_w$ | 5200 |
| $T_g$ (calculated) | 20° C. |

Preparation 5

Preparation 1 was repeated in which the reactor was charged with 9 parts of Solvesso 100 and 7 parts of n-butanol. A mixture of 19.8 parts of styrene, 22.44 parts of 2-ethylhexyl acrylate, 17.16 parts of 2-hydroxyethyl methacrylate, 6.6 parts of gamma-methacryloxypropyl triethoxysilane (Dynasylan MEMO-E HULS), 8.5 parts of Solvesso 100 and 4.5 parts of 2,2'-azobis (methylbutyronitrile) (VAZO 67) were added over 5 hours followed by a rinse with 1 part of Solvesso 100. The reactor contents were kept 10 min at reflux after which 0.5 parts of VAZO 67 dissolved in 1.5 parts Solvesso 100 were added over 20 min followed by a rinse with 1 part of Solvesso 100. The mixture was further held for 30 min at reflux and another 1 part of Solvesso 100 was added. Test results on the resin solution:

| | |
|---|---|
| Solids content | 70.2% |
| Viscosity | Y |
| Hydroxyl Value | 112 |
| Number Average $M_W$ | 2100 |
| Weight Average $M_W$ | 5500 |
| $T_g$ (calculated) | −4° C. |

PREPARATIONS OF POLYESTER POLYOLS

Preparation 6

A flask was charged with 20.96 parts of hydrogenated dimer fatty acids (Pripol 1009 Unichema), 19.88 parts of 2,2-ethylbutyl-1,3-propane diol, 11.1 parts of trimethylolpropane and 21.97 parts of 1,4-cyclohexanedicarboxylic acid (1,4 CHDA). The temperature was raised from 160° C. to 220° C. over 4 hours while the water of condensation was removed. The mixture was held at 220° C. until an acid value of 9–11 was reached. Afterwards, the reactor contents were diluted with 32 parts of Solvesso 100. Test results on the resin solution:

| | |
|---|---|
| Solids content | 68.8% |
| Viscosity | V |
| Acid value | 9.8 |
| Hydroxyl Value | 150 |
| Number Average $M_W$ | 1800 |
| Weight Average $M_W$ | 6100 |

TABLE 1

Preparations 7 to 11 (Polyester Polyols)*
Comparisons A to C

| | Preparation 7 | Comparison A | Comparison B | Preparation 8 | Preparation 9 | Preparation 10 | Preparation 11 | Comparison C |
|---|---|---|---|---|---|---|---|---|
| 1,6-hexanediol | 15.58 | | 22 | | | | 7.58 | 24.56 |
| 2,2'-ethylbutyl 1,3-propane-diol | | 25.05 | | 22.98 | | | 10.45 | |
| neopentylglycol | | | | | 16 | | | |
| 1,4-cyclohexanedimethanol | | | | | | 16.48 | | |
| 1,4-cyclohexanedicarboxylic acid | 24.12 | 18.4 | 22.88 | 26.23 | 24.73 | 22.98 | 22.9 | 22.03 |
| 1,12-dodecanedioicacid | | 20.48 | 20.38 | | | | | |
| trimethylolpropane | 11.79 | 11.1 | 10.7 | 10.58 | 10.3 | 12.78 | 11.33 | 11.95 |
| Pripol 1009 | 23 | | | 14.60 | 23.58 | 21.93 | 21.85 | |
| adipic acid | | | | | | | | 18.69 |
| Solvesso 100 | 32 | 32 | 32 | 32 | 32 | 32 | 32 | 32 |
| Test Results | | | | | | | | |
| Solids | 68.1 | 68 | 68.1 | 68 | 66.7 | 67.7 | 68.2 | 68 |
| Viscosity | U+ | T + ½ | R + ⅓ | V | U + ¼ | Y | U + ¼ | U |
| Acid Value | 9.3 | 9.8 | 9.8 | 9 | 10.8 | 10.3 | 10 | 9.9 |
| Number Av $M_w$ | 2100 | 1700 | 1800 | 1700 | 2000 | 1900 | 1800 | 2400 |
| Weight Av $M_w$ | 7000 | 6200 | 6200 | 5400 | 6200 | 6400 | 5900 | 7500 |

*The polyester polyols were made by the general method of Preparation 6.

Comparisons D, E and F

| | D | E | F |
|---|---|---|---|
| 1,6-hexanediol | 30.31 | 12.74 | 15.71 |
| 2,2-ethylbutyl, 1,3-propane diol | | 12.95 | 15.97 |
| trimethylolpropane | 6.05 | 12.66 | 6.68 |
| adipic acid | 19 | 17.82 | 17.78 |
| 1,4-cyclohexane dicarboxylic acid | 22.39 | 21 | 20.97 |
| Solvesso 100 | 32 | 32 | 32 |
| Test Results | | | |
| Solids | 68.6 | 68.8 | 68.6 |
| Viscosity | N | U + 1/3 | P |
| Acid Value | 9.9 | 10 | 10.5 |
| Number Av $M_W$ | 2200 | 2200 | 2100 |
| Weight Av $M_W$ | 6000 | 8300 | 6100 |

Preparation 12

Preparation 6 was repeated using 15.5 parts of trimethylolpropane and 52.78 parts of Pripol 1010 (Unichema). The batch was held until an acid value of less than 1 was reached before adding 35 parts of Solvesso 100. Test results:

| | |
|---|---|
| Solids content | 65.9% |
| Viscosity | Z3 |
| Acid value | 0.6 |
| Hydroxyl Value | 145 |
| Number Average $M_W$ | 4600 |
| Weight Average $M_W$ | 51000 |

Preparation 13

To 100 parts of the polyester binder solution as in Preparation 12 was added 0.1 part of dibutyltindilaurate and the mixture was heated to 60° C. Then, 3.8 parts of 3-isocyanatopropyltrimethoxy silane was added followed by a rinse with 1 part of Solvesso 100. The mixture was held at 60° C. until the NCO band in IR had disappeared. Then, 1 part of n-butanol was added. The polyester polyols of Preparations 12 and 13 can be combined with any of components (i) and (iii) to prepare coating compositions of this invention. Test results on this polyester polyol showed the following:

| | |
|---|---|
| Solids content | 65.8% |
| Viscosity | Z4 |
| Acid value | 0.9 |
| Hydroxyl Value | 130 |
| Number Average $M_w$ | 4300 |
| Weight Average $M_w$ | 75300 |

EXAMPLES 1 TO 6

A typical clearcoat formulation was prepared having the components shown below:

| | |
|---|---|
| acrylic polyol of Preparation 1 | 11.48 |
| acrylic polyol of Preparation 1 modified with 5% of an organic rheology control agent[1] | 24.522 |
| polyester polyol[2] | 18.051 |
| melamine formaldehyde Luwipal 013 (BASF) resin | 17.155 |
| malamine formaldehyde Luwipal LR8735 (BASF) resin | 6.743 |
| Tinuvin 1130 (Ciba) | 0.788 |
| Tinuvin 292 (Ciba) | 0.394 |
| Irganox 1010 solution (Ciba) | 0.944 |
| Reomet TTA solution (Ciba) | 0.147 |
| Silicone 017 solution (Bayer) | 0.458 |
| Solvesso 150 | 6.422 |
| dodecylbenzenesulfonic acid blocked with 2-amino methylpropanol | 1.238 |
| Solvesso 100 | 1.559 |
| butylcarbitol | 3.669 |
| xylene | 6.430 |

[1]Rheology control agent based on a diurea prepared from benzylamine and hexamethylene diisocyanate.
[2]Examples 1 to 6 are those wherein polyester polyols of Preparations 6 to 11, respectively, were used.

The clearcoat was applied wet-on-wet on a blue basecoat. The panel preparation and coating thickness were as follows:

| | |
|---|---|
| Substrate: | Act-Tru Cold roll steel B952 P60 DIW: MATT |
| Primer Surfacer | 30–35 microns DFT 30' at 145° C. bake |
| Basecoat | ±15 microns DFT |
| Clearcoat | ±40–45 microns DFT Baking Base + clearcoat 30 min at 140–145° C. |

DFT = Dry Film Thickness.

After baking, the panels were rated for in-place properties such as gloss, adhesion, humidity, xylene-resistance, acid-resistance ($H_2SO_4$), chipping, hardness (Persoz, Fisher) and flexibility. The clearcoat formulations all passed typical original equipment manufacturers' specifications.
Comparisons of Appearance And Scratch Performance vs. Coatings Without Component (ii)

The test results in Table 2 demonstrate the advantage of using dimer fatty acids in the polyester polyol which improves scratch performance and appearance. The appearance is rated visually in an appearance test which is equivalent for the strike-in resistance of the clearcoat on the basecoat.

The scratch performance test was run by subjecting the panel to 60 cycles of a rotary synthetic brush (polyethylene) combined with a well-defined abrasive solution. The scratch performance indicates the percent of gloss loss after scratching. Scale of appearance in descending order is excellent, very good, good-very good, good, fair-good, fair, poor. The important consideration is that both appearance and scratch resistance must be in balance. Thus, in Table 2, scratch performances wherein there is 22% of gloss loss can be tolerated when the appearance remains "good-very good". However, even a 5% loss is unacceptable when the appearance is only "fair".

TABLE 2

| Example/Comparison | Appearance | Scratch Performance (%) |
|---|---|---|
| Example 1 | Excellent | −15 |
| Example 2 | Very Good | −3 |
| Example 3 | Good-Very Good | −22 |
| Example 4 | Excellent | −15 |
| Example 5 | Very Good | −20 |
| Example 6 | Excellent | −10 |
| Comparison (acrylic polyol of Preparation 1; no polyester polyol) | Fair-Good | −30 |
| Comparison A | Fair-Good | −9 |
| Comparison B | Fair | −5 |
| Comparison C | Poor | — |
| Comparison D | Poor | — |
| Comparison E | Poor | — |
| Comparison F | Poor | — |

What is claimed is:

1. A coating composition of a crosslinkable binder in an organic solvent, the binder comprising the following components based on total weight of binder:

i) about 15 to 70 percent of an acrylic polyol having a weight average molecular weight of about 2,500 to 40,000; a hydroxyl value of about 50 mg KOH/g to 180 mg KOH/g; and a glass transition temperature of between −30° C. to 70° C.;

ii) about 5 to 60 percent of an optionally substituted polyester polyol having a weight average molecular weight of about 2,000 to 80,000; and a hydroxyl value of about 50 mg KOH/g to 220 mg KOH/g; the optional substituent selected from at least one member of the group trialkoxysilyl and urethane;

the polyester polyol comprising at least about 10 percent by weight of the hydrogenated reaction product of at least one of:
   a) dimer fatty acid and polyol,
   b) polyacid and dimer alcohol, and
   c) dimer fatty acid and dimer alcohol, wherein said dimer fatty acid and said dimer alcohol each have at least 34 carbon atoms and at least two groups selected from acid and alcohol functionalities; and iii) about 10 to 60 percent of a crosslinking agent selected from at least one of an alkoxylated melamine formaldehyde adduct and a polyisocyanate.

2. A composition according to claim 1 in which the acrylic polyol has a molecular weight of 3,000 to 10,000; a hydroxyl value of 80 mg KOH/g to 150 mg KOH/g; and a glass transition temperature of −10° C. to 50° C.

3. A composition according to claim 1 in which the acrylic polyol contains at least one trialkoxysilyl group.

4. A composition according to claim 1 in which the polyester polyol has a molecular weight of 2,500 to 15,000; a hydroxyl value of 100 mg KOH/g to 170 mg KOH/g ; and about 30 to 60 percent, by weight of polyester polyol, of hydrogenated reaction product selected from a), b) and c).

5. A composition according to claim 1 in which the polyester polyol contains substituents selected from at least one member of the group trialkoxysilyl and urethane.

6. A composition according to claim 1 in a two-package system wherein one package comprises the acrylic and polyester polyols and the other comprises an unblocked polyisocyanate.

7. A composition according to claim 1 which is a topcoat.

8. A composition according to claim 7 which is a clearcoat.

* * * * *